Sept. 9, 1958     R. L. NOWAK     2,851,203
MILK BOTTLE CAP
Filed Dec. 19, 1956
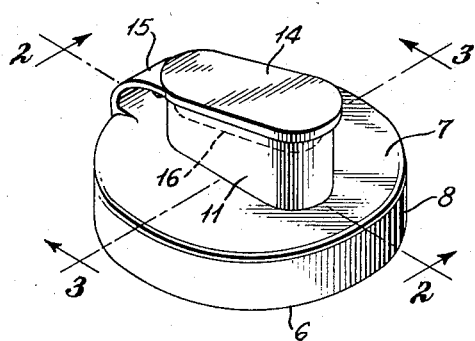
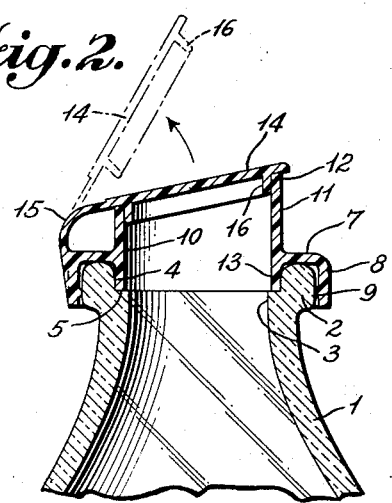
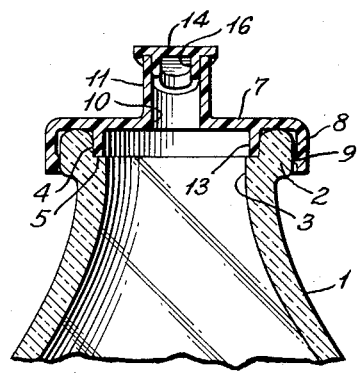
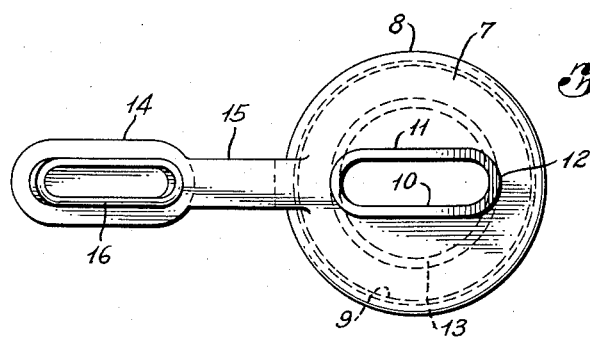
INVENTOR
Roger L. Nowak
BY Stevens, Davis, Miller & Mosher
ATTORNEYS 2,851,203
Patented Sept. 9, 1958

2,851,203
MILK BOTTLE CAP

Roger L. Nowak, West Boylston, Mass.

Application December 19, 1956, Serial No. 629,376

3 Claims. (Cl. 222—543)

The present invention relates to a novel cap for a milk bottle; more particularly this invention relates to a milk bottle cap having a pouring spout and a means for closing the same.

In the pouring of liquids such as milk, water, etc., from containers having smooth rounded openings (as in the case of milk bottles), it is a well recognized fact that the liquid tends to follow the outer surface of the container away from the opening, thus causing an undesirable flowing or dripping of liquid at a position or positions remote from the container opening. Such a tendency makes it difficult to pour liquid from such a container without some attendant spillage.

Therefore, it is a principal object of this invention to provide a milk bottle cap having a pouring spout which will prevent the undesirable dripping or spillage indicated above.

A further object of this invention is to provide a milk bottle cap of the type referred to above wherein the span of the pouring spout is equal to the inside diameter of the container's neck so as to permit a maximum passage of air into the interior of said container during a pouring operation.

A further object of this invention is to provide a milk bottle cap of the type referred to above including an integral cover for the pouring spout.

Another object of this invention is to provide a milk bottle cap of the type referred to above including an interconnecting flexible strap extending between the spout cover and the cap, the length of the strap being such that the cover of the spout is always properly positioned over the spout opening when the cover is pivoted towards the opening.

Another object of this invention is to provide a milk bottle cap of the type referred to above which will be substantially leak-proof when the spout cover is in its closed position.

Other and further objects and advantageous features of this invention will hereinafter more fully appear in connection with a detailed description of the drawings in which:

Figure 1 is a perspective view of the cap showing the pouring spout and spout cover in the closed position.

Figure 2 is a section view taken along section line 2—2 of Figure 1 showing the cap as applied to a milk bottle; the dotted line position of the spout cover indicates an open position of the pouring spout.

Figure 3 is a section view taken along section line 3—3 of Figure 1 showing the relative positions of bottle and cap when the latter has been applied to a milk bottle.

Figure 4 is a plan view of the cap showing the spout cover extending to the left in a substantially coplanar relation with the top surface of the cap.

Referring to the drawings in detail, Figures 2 and 3 show in cross-section the upper portion of a conventional milk bottle 1, which is provided at its upper open end with a smooth outwardly projecting head or annular lip portion 2 surrounding the mouth of the bottle. The inner portion 3 of the mouth of the bottle is provided with a conventional enlarged opening and flat annular ledge 5 which permit the insertion of a conventional inner milk bottle cap (not shown).

The novel plastic cap 6 of the present invention (which covers and seals the mouth of the milk bottle 1) is provided with a generally flat circular portion 7 and an outer depending flange or skirt portion 8 which is adapted to encircle the outer bead or lip 2 of the bottle. The skirt 8 is provided with an inwardly projecting ring-shaped portion 9 which (as best shown in Figures 2 and 3) effects a tight seal between the cap and bottle.

The upper surface of the cap is provided with a narrow elongated opening 10 and a pouring spout 11 which projects upwardly from the upper surface of the cap around the edges of the opening. The upper end of the pouring spout 11 is inclined so as to provide a pouring tip 12. It should be observed in Figure 2 that length of the opening 10 (as well as the inner length of the pouring spout 11) is substantially equal to the inner diameter of the neck of the bottle, as indicated at 3.

An inner annular flange 13 projects downwardly from the inner surface of the flat circular portion 7 in parallel relation with the outer flange portion 8. The outer diameter of the flange 13 is equal to the diameter of the enlarged opening 4 in the mouth of the milk bottle, whereas the inner diameter of this flange 13 is substantially equal to the inner diameter of the neck of the bottle (as indicated at 3). As best shown in Figures 2 and 3, the lip 2 of the bottle fits snugly into the annular space between the flanges 8 and 13. The height of flange 13 is such that its lower edge terminates adjacent the annular ledge 5 in the mouth of the bottle.

An elongated cover 14 adapted to seal the upper end of the pouring spout 11 is attached to one edge of the cap 6 (at the juncture of surface 7 and flange 8) by means of an integral flexible strap 15. The under surface of the cover 14 is provided with an integral rim portion 16 which fits snugly into the upper portion of the pouring spout 11. The length of the strap 15 is such that the rim portion 16 will always be properly seated in the opening of the spout 11 as the cover 14 is pivoted (or swung) into its closed position.

The cap of the instant invention is preferably made of flexible plastic material such that the entire cap (including the spout cover and interconnecting strap) can be molded in a single operation as a one-piece item. However, the cap could be made from other equivalent materials.

Whereas the present invention has been described in particular reference to the illustrations in the drawings, other and further modifications, apart from those suggested herein, may be made within the spirit of this invention.

What is claimed is:

1. A flexible one-piece plastic cap for a milk bottle of the type having an upper open end, a smooth rounded lip portion surrounding said open end, and an enlarged coaxial recessed opening on the inner surface of said lip portion terminating in a flat horizontal ledge at a fixed distance from the upper edge of said lip portion, comprising a relatively flat circular crown portion, a peripheral skirt portion depending downwardly from the outer edge of said crown portion, said skirt portion being of sufficient size to engage the outer side edge of said lip portion in a substantially fluid pressure-tight relationship, an inner annular flange extending downwardly from said crown portion for a distance approximately equal to said fixed distance, said inner flange being coaxial with said skirt portion and being of sufficient size to fit into said enlarged recessed opening in a substantially close-fitting relationship, a narrow and elongated pouring spout extending upwardly from the upper surface of said crown portion across the center thereof, said pouring spout being provided with a through-opening which extends from the upper end of said spout to the lower end thereof and through said crown portion, said through opening being substantially equal in its horizontal length to the diameter of the open end of said bottle, the upper end of said pouring spout being inclined so as to effect a pouring tip at one end of said spout, an elongated flat cover for the upper end of said spout, and a thin flexible strap connecting from one side edge of said cover to the outer edge of said crown portion.

2. A flexible one-piece plastic cap for a milk bottle of the type having an upper open end, a smooth rounded lip portion surrounding said open end, and an enlarged coaxial recessed opening on the inner surface of said lip portion terminating in a flat horizontal ledge at a fixed distance from the upper edge of said lip portion, comprising a relatively flat circular crown portion, a peripheral skirt portion depending downwardly from the outer edge of said crown portion, an inwardly projecting ring-shaped rim on the inner surface of said skirt portion, said skirt portion being of sufficient size to effect a tight fitting engagement between said rim and the outer side edge of said lip portion, an inner annular flange extending downwardly from said crown portion for a distance approximately equal to said fixed distance, said inner flange being coaxial with said skirt portion and being of sufficient size to fit into said enlarged recessed opening in a substantially close-fitting relationship, a narrow and elongated pouring spout extending upwardly from the upper surface of said crown portion across the center thereof, said pouring spout being provided with a through-opening which extends from the upper end of said spout to the lower end thereof and through said crown portion, said through opening being substantially equal in its horizontal length to the diameter of the open end of said bottle, an elongated flat cover for the upper end of said spout, and a thin flexible strap connecting from one side edge of said cover to the outer edge of said crown portion.

3. A flexible one-piece plastic cap for a milk bottle of the type having an upper open end, a smooth rounded lip portion surrounding said open end, and an enlarged coaxial recessed opening on the inner surface of said lip portion terminating in a flat horizontal ledge at a fixed distance from the upper edge of said lip portion, comprising a relatively flat circular crown portion, a peripheral skirt portion depending downwardly from the outer edge of said crown portion, an inwardly projecting ring-shaped rim on the inner surface of said skirt portion, said skirt portion being of sufficient size to effect a tight fitting engagement between said rim and the outer side edge of said lip portion, an inner annular flange extending downwardly from said crown portion for a distance approximately equal to said fixed distance, said inner flange being coaxial with said skirt portion and being of sufficient size to fit into said enlarged recessed opening in a substantially close-fitting relationship, a narrow and elongated pouring spout extending upwardly from the upper surface of said crown portion across the center thereof, said pouring spout being provided with a through-opening which extends from the upper end of said spout to the lower end thereof and through said crown portion, said through opening being substantially equal in its horizontal length to the diameter of the open end of said bottle, an elongated flat cover for the upper end of said spout, and a thin flexible strap connecting from one side edge of said cover to the outer edge of said crown portion, said strap being of a predetermined length so that, as said cover is pivoted on said strap towards said spout, said cover will always be properly seated against said upper opening of said spout.

References Cited in the file of this patent

UNITED STATES PATENTS

| | | |
|---|---|---|
| 2,322,527 | Leatherman | June 22, 1943 |
| 2,625,306 | Murphy | Jan. 13, 1953 |
| 2,690,861 | Tupper | Oct. 5, 1954 |
| 2,695,732 | Tupper | Nov. 30, 1954 |